United States Patent [19]

Schtëufer

[11] Patent Number: 4,653,317
[45] Date of Patent: Mar. 31, 1987

[54] ADAPTER FOR CONNECTING A PRESSURE LINE TO THE PERFORATED SURFACE OF A MODEL TO BE TESTED IN THE WIND TUNNEL

[75] Inventor: Berthold Schtëufer, Bergisch, Fed. Rep. of Germany

[73] Assignees: Deutsche Forschungs; Versuchsanstalt fur Luft; Raumfahrt e.V., all of Bonn, Fed. Rep. of Germany

[21] Appl. No.: 752,930

[22] Filed: Jul. 8, 1985

[30] Foreign Application Priority Data

Jul. 18, 1984 [DE] Fed. Rep. of Germany ....... 8421459

[51] Int. Cl.$^4$ .......................................... G01M 19/00
[52] U.S. Cl. ......................................... 73/147; 73/756
[58] Field of Search ................. 73/147, 756; 277/165, 277/227; 138/109, 106; 428/131; 285/189, 137.1, 137.2, 9.1, 9.2

[56] References Cited

U.S. PATENT DOCUMENTS 3,471,178 10/1969 Roe .................................. 285/137.1
3,791,207 2/1974 Jackson et al. ........................ 73/147

Primary Examiner—Donald O. Woodiel
Attorney, Agent, or Firm—Spensley Horn Jubas & Lubitz

[57] ABSTRACT

To measure the pressure distribution at an airplane model and the like, the surface of the model is provided with a number of holes (11). An adapter (25) of elastomeric material adapted to be joined via a pressure duct (24) to a testing means is placed on each hole (11). A plurality of connecting hoses (13) extending out of the model (10) are joined to a measuring point selector (14). Each adapter (25) contains a self-adhesive flange by which the adapter may be sealingly mounted quickly and by simple means to a measuring bore.

32 Claims, 5 Drawing Figures

ADAPTER FOR CONNECTING A PRESSURE LINE TO THE PERFORATED SURFACE OF A MODEL TO BE TESTED IN THE WIND TUNNEL

The invention relates to an adapter for connecting a pressure duct to the perforated surface of a model to be tested in a wind tunnel and to a take-off means for such adapters.

To measure the pressure distribution at models situated in the wind tunnel, the surface of the model is provided with a number of holes having a diameter of about 0.5 mm. Inside the model, a thin tube is connected to each hole. All of the tubes are united to form a bundle extending out of the model. The ends of the tubes are connected to a measuring point selector which is adapted to connect each tube to a pressure/voltage transformer in order to select the pressure of a specific measuring point for its evaluation. It does not happen infrequently that a model is provided with hundreds of measuring points thus requiring that a respective number of tubes need be directed out of the model. The risk of confusions of the tubes is very high. Further, errors may be caused by the kinked, closed or untight pressure lines. By confusing the pressure lines and due to defective lines or connections, one may get a wrong idea of the really existing pressure distribution. To control individual measuring points, a determined pressure is to be applied to the respective hole. In the absence of said pressure value in case of the evaluation of the measuring signals, a mistake may be assumed. In view of the small-sized and closely spaced measuring bores, it is very difficult to apply a definite pressure to a specific bore, the more as the surfaces of the models under testing are frequently curved.

It is the object of the invention to provide an adapter of the above mentioned type permitting it to directly connect by simple means individual measuring bores to a pressure source in order to test the measuring bore including the pressure duct connected thereto or to connect additional measuring bores to the evaluation means.

The problem is solved according to the invention in that one end of a hose portion of elastomeric material contains a flange molded thereto in one piece and carrying an adhesive agent.

According to the invention, prefabricated adapters of a soft-elastic material are provided which comprise a self-adhesive flange by which they may be quickly connected to a measuring bore. The deformable flange also fits excellently into curved surfaces of the model so that a sealing connection of the hose portion to the surface of the model is ensured and secondary air may not flow out. A pressure hose may be slipped into the hose portion preferably made of rubber, said pressure hose extending to a pressure source supplying a defined pressure. The measuring bore thus being provided with a defined pressure, it is simple to test whether a corresponding pressure does exist at the tube end assigned to said measuring point. It is also possible to measure at the tube end the time of the pressure built-up. As a result, confusions of lines and line defects may be easily detected.

It is further possible to use the adapter for the subsequent provision of measuring points. It is sometimes desirable for measurements in subsonic wind channels, e.g. for flow measurements with motor vehicles, to provide additional measuring points upon the installation of the measuring systems. In such a case, an additional measuring bore need be only fitted at the model to apply the adapter of the invention from the inside against the bore. After all, a hose may be connected to the adapter and directed out of the model.

Preferably, the adhesive means consists of a bilaterally coated adhesive tape of which one side adheres to the flange while its other side is covered with a protective foil. To prohibit tearing of the adhesive tape with resultant traces on the model when the adapter is removed, the tape is preferably made of a fabric structure. The adhesive should be selected such as to avoid traces on the surface of the model when the adapter is removed therefrom.

According to a preferred embodiment of the invention, adhesiveness of the tape to the material of the adapter is higher than that to metal or varnish. Thus, it is ensured that, with the removal of the adapter, the adhesive tape rather sticks to the latter than to the model.

Conveniently, starting from an area of constant thickness, the wall of the hose portion is increasing towards the flange thus preventing the adapter from kinking near the latter. The wall thickness of the flange is substantially inferior to that of the hose portion so that the flange is very soft and easily deformable to adapt itself excellently to the model contour.

The invention also relates to a take-off device of the mentioned adapters characterized in that a sheet of bilaterally coated perforated adhesive tape is provided which contains at its underside a perforated first protective foil, the upper side of said sheet being fitted with a second protective foil which includes a number of holes concentric to the perforations and in which the respective flange of an adapter adheres to the adhesive tape, the regions of the adhesive tape to which an adapter adheres being punched out of the adhesive tape. Such a take-off means is particularly suitable because the adapters are relatively small (length about 10 mm, width of flange about 10 mm) and a great number thereof is required for the operation in wind tunnels. The flanges of the adapters are placed directly on the punched out parts of the adhesive tape and need be only lifted with them from the perforated first protective foil. Thus, it is possible of seizing the adapter with one hand to remove it from the sheet and of using the same hand to apply it to the model. If the adapter is removed from the first protective foil, the perforated adhesive tape sticks to the flange outside. The outside of the adhesive tape is exposed to the air, but only for a short time, prior to being applied to the model. By this means, there is very little risk for contaminations of the adhesive surface.

One embodiment of the invention will be explained hereunder in more detail with reference to the drawings.

Figure 1:
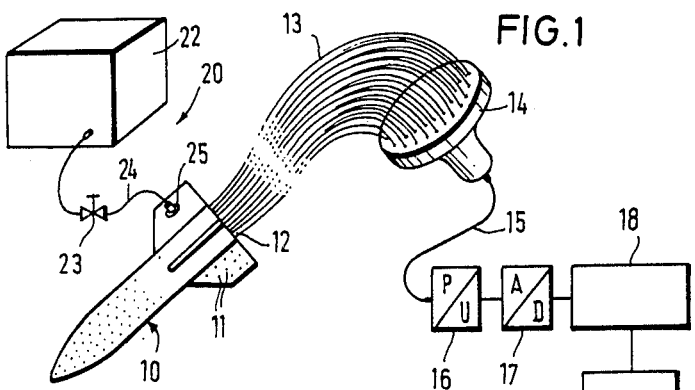
FIG. 1 is a schematic view to show how to use an adapter in a wind tunnel.

FIG. 1 shows a mode 10, e.g. a rocket to be tested in the wind tunnel and comprising in its surface a plurality of holes 11 or test bores to which thin metal tubes 12 are applied from the inside and from each of which extends a thin tube out of the model 10.

The ends of said tubes 12 are connected via flexible connecting hoses 13 to a measuring point selector 14 adapted to connect each of the numerous pressure lines to a measuring duct 15 extending to a pressure/voltage transformer 16 whose output is joined to the input of an analog-to-digital converter 17 whose output supplies the digitized pressure values as measured to the computer 18 controlling a printer 19.

For instance if the pressure value of a specific hole 11 appears to be unusual, the respective hole and its pressure line may be tested with the testing means 20 which contains a pressure source 22 supplying compressed air at a defined pressure and being joined via a valve 23 to a pressure line 24 whose one end is provided with the adapter 25. A scaled up illustration of said adapter may be seen in FIG. 3.

The adapter consists of a hose member 26 having at its one end a radially projecting flange 27. Adjacent to the latter, in the region 28, the hose shape is frustoconical. The adapter 25 comprises a cylindrical channel 29 extending continuously from one end of the adapter to the other and having a constant cross section over its total length. The adapter described herewith consists of a one-piece rubber element. The front end of the flange 27 except for the opening of the channel 29 is covered with an adhesive tape 30 coated bilaterally with an adhesive, the adhesive surface being flatly bonded to the flange 27. The outer adhesive surface of the adhesive tape 30 may be applied to the surface of model 10, the fixation of the adapter 25 at the model 10 being achieved in that the channel 29 is exactly aligned with one of the holes 11. The end of the pressure line 24 is sealingly mounted in the rear end of channel 29. Upon opening the valve 23, the respective hole 11 may be directly exposed to a defined pressure. If the line of said hole is selected at the measuring point selector 14, it is possible to determine with the evaluating means whether the pressure in the corresponding line 13 is correct i.e. whether or not lines were confused and whether or not the flow resistance of the line is too high.

Figure 2:
FIG. 2 shows another application of the adapter.

The application shown in FIG. 1 is generally used with supersonic wind tunnels. FIG. 2 shows another applicability particularly contemplated for subsonic wind tunnels used for testing larger objects. According to FIG. 2, the adapter 25 is provided to connect the hole 11 in the outer skin 31 of a model to a line 32, the flange of the adapter 25 being bonded to the inside of the outer skin 31 by strictly taking care that the channel of the adapter is in alignment with the hole 11. Line 32 is slipped into the rear end of the adapter to thus permitting with simple means to subsequently provide measuring points.

Figure 3:
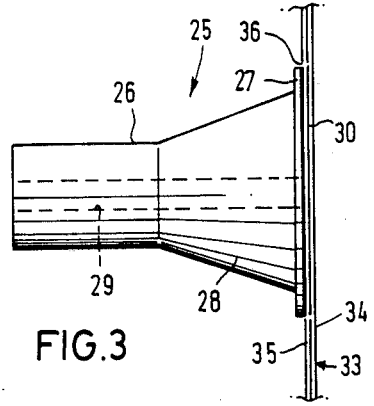
FIG. 3 is a side view of the adapter still seated in the take-off means.
Figure 4:
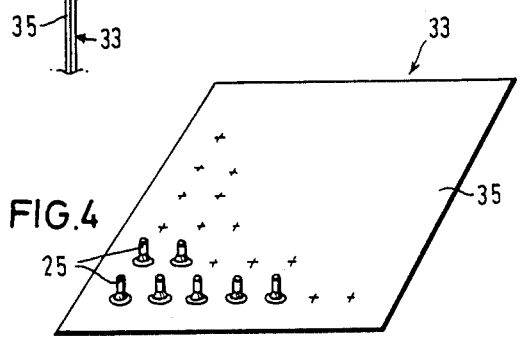
FIG. 4 is a perspective view of the take-off means including a plurality of adapters and FIG. 5 shows a section of a plurality of adapters and the take-off means.
Figure 5:
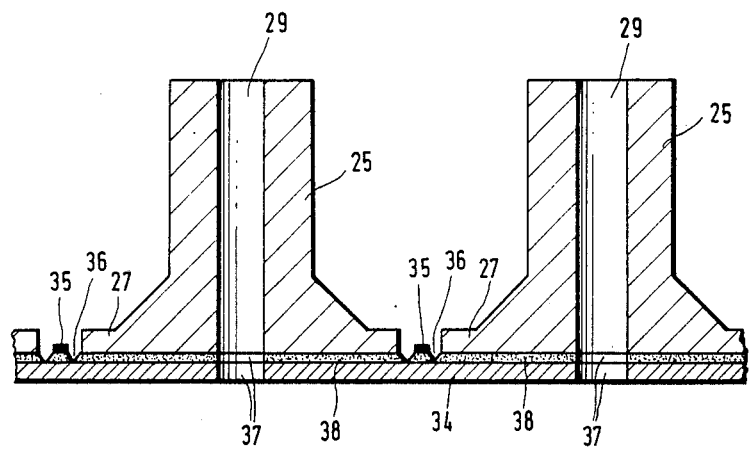

FIGS. 3 to 5 show a take-off device 33 carrying a number of adapters ready for removal. Said take-off device 33 consists of a sheet of the adhesive tape 30 covered at its underside with a first protective foil 34 and at its top with a second protective foil 35.

The first protective foil 34 contains perforations 37 having a diameter which corresponds substantially to the diameter of the channels 29 of the adapters 25 and which are situated also in the adhesive tape 30. In the adhesive tape 30 as well as in the second protective foil 35, there are punched out for each adapter 25 a disk 38 or a concentric open hole 36 the shapes and sizes of which correspond to each other and also to the end face of the adapter and to that of the flange 27. Due to the concentric perforation 37, an annular shape is imparted to the disk 38 which adheres to the lower first protective foil 34. On the annular disk 38 of the adhesive tape 30, the end side with flange 27 of an adapter 25 is pressed through hole 36.

As evident from FIG. 4, the individual adapters 25 are positioned matrix-wise on the sheet of the take-off means, and through the disk 38 of the adhesive tape 30, they stick to the perforated first protective foil 34. If an adapter 25 is withdrawn, the respective disk 38 of the the adhesive tape 30 bonded to said adapter is detached from the lower protective foil 34. The outside of said disk 38 then may be pressed against the model thus ensuring that the adapter 27 firmly adheres to said model. The adhesiveness of the adhesive foil 30 to the rubber of the adapter 27 is higher than that of the adhesive foil to the model. By this means, it is possible to remove again from the model the adapter 27 together with the adhesive tape 30. Said adhesive tape 30 is a fabric tape imbibed with an adhesive and being resistant to tear upon its removal. Thus, the adapter may be safely taken off the model without leaving traces.

In the embodiment of FIG. 2, it is preferred to use an adhesive of the permanent type. Preferably, the adhesive is based on acryl, the rubber being caoutchouc-based.

What is claimed is:

1. An adapter for connecting a pressure line to a perforated surface of a model to be tested in a wind tunnel, the adapter comprising:
    a hose terminal portion of the pressure line, which portion of elastomeric material with a terminus having an integral flange molded in one piece and supporting an adhesive means for adhering the flange to the perforated surface.

2. An adapter according to claim 1 wherein the adhesive means further comprises:
    a bilaterally coated adhesive tape adhering unilaterally to the flange while its other side is covered with a protective foil.

3. An adapter according to claim 2 wherein the adhesive tape further comprises:
    a fabric structure.

4. An adapter according to claim 2 wherein the adhesiveness of the adhesive tape to the material of the adapter is higher than to metal or varnish.

5. An adapter according to claim 2 wherein the adhesive means further comprises:
    a sheet of bilaterally coated and perforated adhesive tape having at a side adhering to the perforated surface a perforated first protective foil, the side of the sheet adhering to the flange being fitted with a second protective foil containing a number of areas situated about the perforations and in which areas a flange of an adapter adheres to the tape, the areas of the adhesive tape to which the adapter adheres being punched out of the second protective foil.

6. An adapter according to claim 1 wherein the terminal portion starts from a region of constant thickness with the wall of the portion increasing in thickness towards the flange.

7. In a system for testing a model within surrounding pressurized fluid flow having
    a model with a multiplicity of bores upon its surface;
    a multiplicity of fluid pressure communicating means for communicating the fluid pressure at each of a like multiplicity of bores to a selection means;

selection means selected for gating the fluid pressure of a selected one of the multiplicity of fluid pressure connecting means to a measuring means; and measuring means for measuring a received fluid pressure; an apparatus improvement according that the system is validated for the communicating, the gating, and the measuring of a fluid pressure at a one of said multiplicity of bores, the improvement comprising:

pressure source means for supplying fluid under a pressure; and connecting means for connecting the fluid under the pressure to a selected one bore within a model which has a multiplicity of bores, all other bores of the multiplicity of bores not connecting to the fluid under the pressure;

wherein the selection means is selected for gating the fluid pressure of the selected one bore to the measuring means; and wherein IF the measuring means measures the pressure THEN the system having the model, the fluid pressure communicating means, the selection means, and the measuring means is validated for the communicating, the gating, and the measuring ELSE IF the measuring means does not measure the pressure THEN the system is not validated, meaning that failure exists collectively within the model, the fluid pressure communicating means, the selection means, and the measuring means.

8. The apparatus improvement of claim 7 wherein said pressure is a predetermined, fixed pressure.

9. The apparatus improvement of claim 7 wherein said connecting means further comprises:

a flexible pressure hose of elastomeric material.

10. The apparatus improvement of claim 9 wherein said hose further comprises:

an integral frustoconically-shaped termination at the hose end connecting the fluid under the pressure to the selected one bore.

11. The apparatus improvement of claim 9 wherein said hose further comprises:

a flange termination at the hose end connecting the fluid under the pressure to the selected one bore.

12. The apparatus improvement of claim 11 wherein the flange is temporarily affixed, for allowing the hose to conduct the fluid under the pressure to the selected one bore, at the model by adhesive.

13. The apparatus improvement of claim 9 wherein the hose is temporarily affixed, for connecting the fluid under the pressure to the selected one bore, at the model by adhesive.

14. The apparatus improvement of claim 7 wherein the connecting means is temporarily affixed, for connecting the fluid under the pressure to the selected one bore, at the model by adhesive.

15. A system for temporarily conducting fluid under a pressure to a bore within the curved planar surface of a model which is instrumented to detect pressure at the bore, the system comprising:

a source of fluid under a pressure;

a pressure line for conducting the fluid under the pressure from the source to a position proximate the bore; and an adapter for temporarily conducting the fluid under the pressure from the pressure line at its position proximate the bore to the bore within the curved planar surface of the model, the adapter realizing the temporarily conducting of the fluid to the bore by temporarily adhering to the curved planar surface.

16. The system according to claim 15 wherein the pressure line further comprises:

an elastomeric material pressure hose; and wherein the adapter further comprises:

an elastomeric material adapter.

17. An adapter for making flow connection between an orifice of a flexible hose and a hole within and defined by a surface, the adapter comprising:

a generally cylindrical member having an interior cylindrical channel encasing pressure tight the exterior surface of the flexible hose proximate one terminus of the hose, the member encasing the hose providing at the terminus of the hose of a flexible flange positioned about the orifice of the hose, the flange being provided on its surface which is facing oppositely to the hose with an adhesive;

wherein the flexible flange is temporarily affixed to the surface by the adhesive in a position providing that the orifice of the flexible hose is in flow connection with the hole of the surface; and wherein the adhesive affixation may be broken and the flow connection of the orifice of the flexible hose to the hole of the surface may be severed.

18. The adapter of claim 17 wherein the member is frustoconical in exterior shape at least in a portion of the region whereat its internal channel encases pressure tight the exterior surface of the pressure hose proximate the terminus of such hose.

19. The adapter of claim 17 wherein the adhesive is bilaterally coated adhesive tape.

20. The adapter of claim 17 wherein when the adhesive affixation is broken then the adhesive will substantially adhere to the flange and will insubstantially adhere to the surface.

21. An adapter for establishing flow communication from a pressure line to an orifice within a surface of a model, the adapter comprising:

a hose of flexible material making at one end a flow communication to the pressure line, and having at the other end a flange to which adhesive is applied;

wherein the adhesive adheres the flange to the model surface at a position surrounding said orifice so that the pressure line is in flow communication through the hose to the orifice within the model surface.

22. The adapter according to claim 21 wherein said flow communication to the pressure line is by a hose of elastomeric material which receives, and which retains by elastomeric force, the pressure line within its interior channel.

23. The adapter according to claim 21 wherein the adhesive allows temporary adhering of the flange to, and subsequent removal of the flange from, the surface therein making and braking the flow communication.

24. The adapter according to claim 23 wherein the adhesive is bilaterally coated adhesive tape.

25. An adapter for connecting for flow communication a a channel of a pressure line to a bore within a surface of a model to be tested in a wind tunnel, the adapter comprising:

a hose of elastomeric material with a flange supporting adhesive on one end, the flange adhering to the surface so that the channel of the hose is in flow communication with the bore, and the other end of the hose receiving and retaining the pressure line so that the channel of the hose is in flow communication with the channel of the pressure line.

26. The adapter according to claim 25 wherein the flange and the hose are molded in one piece.

27. The adapter according to claim 25 wherein the adhesive is a bilaterally coated adhesive tape.

28. An adapter for use in establishing flow communication of pressurized fluid within a pressure hose to an orifice within a surface of a model tested in a wind tunnel, the adapter comprising:
  a generally conically-shaped member retaining within an interior cylindrical channel the pressure hose proximate its terminus, and having at the base of the cone a flange supporting adhesive, the adhesive temporarily mounting the member to the surface at a position about the orifice so that pressurized fluid within the retained pressure hose is in flow communication to the orifice.

29. In a wind tunnel test system having a model instrumented so that an airflow pressure impinging generally upon the entire model may be measured at each of a multiplicity of bores upon the surface of the model, an improvement allowing that the pressure measured at each bore may be tested one bore at a time, the improvement comprising:

pressure source means for supplying fluid under pressure through a hose;
  adapter means for temporarily connecting the fluid under pressure from the hose to successive ones of the bores upon the surface of the model one bore at a time, the adapter means performing the temporarily connecting by temporarily adhesively adhering to the surface of the model at a position surrounding a one bore simultaneously to positionally retaining the hose, the adhering and the retaining jointly making that the flow of fluid under pressure is from the hose by way of the adapter means to the bore.

30. The improvement according to claim 29 wherein the adapter means further comprises:
  a flange supporting adhesive for temporarily adhesively adhering to the surface of the model.

31. The improvement according to claim 30 wherein the flange is flexible for good surface-to-surface contact in adhesively adhering to a curved surface of the model.

32. The improvement according to claim 29 wherein the adapter means is of elastomeric material retaining the hose by elastomeric forces.

* * * * *

UNITED STATES PATENT AND TRADEMARK OFFICE
CERTIFICATE OF CORRECTION

PATENT NO. : 4,653,317
DATED : Mar. 31, 1987
INVENTOR(S) : BERTHOLD SCHAFER

It is certified that error appears in the above-identified patent and that said Letters Patent is hereby corrected as shown below:

In the designation of patentee (below left [19], replace "Schte,uml/a/fer" with --Schafer--

At [75] Inventor: replace "Berthold Schte,uml/a/fer"

with --Berthold Schafer--.

At [73] Assignees: replace "Deutsche Forschungs; Versuchsanstalt fur Luft; Raumfahrt e.V." with --Deutsche Forschungs- und Versuchsanstalt fur Luft- und Raumfahrt e.V.--.

Signed and Sealed this
Eleventh Day of August, 1987

*Attest:*

DONALD J. QUIGG

*Attesting Officer*         *Commissioner of Patents and Trademarks*